Nov. 9, 1937.  R. M. LANYON  2,098,688
TIRE MOLD
Filed Jan. 21, 1936  2 Sheets-Sheet 1
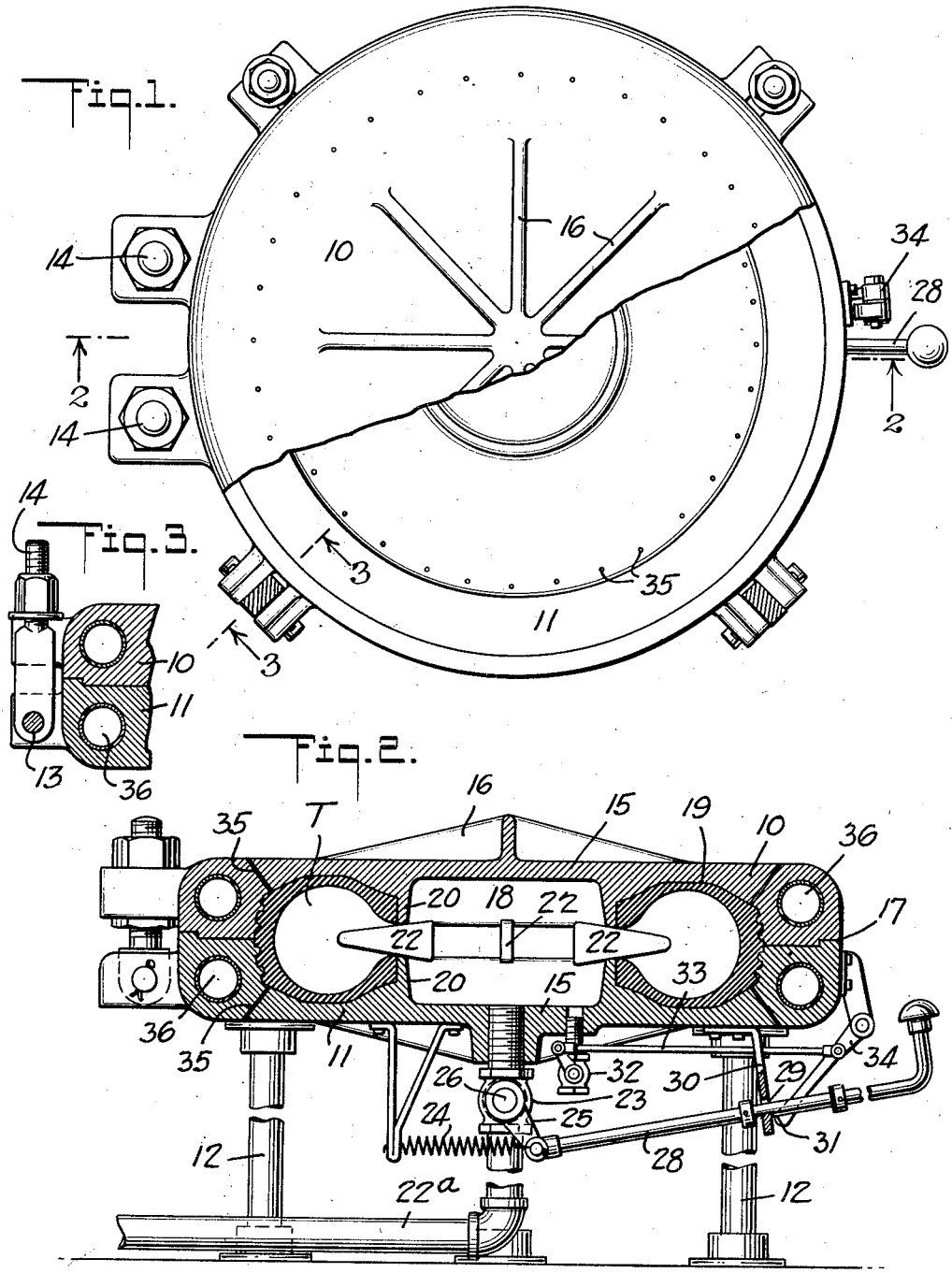
INVENTOR
ROBERT M. LANYON
BY
ATTORNEYS Nov. 9, 1937. R. M. LANYON 2,098,688
TIRE MOLD
Filed Jan. 21, 1936 2 Sheets-Sheet 2
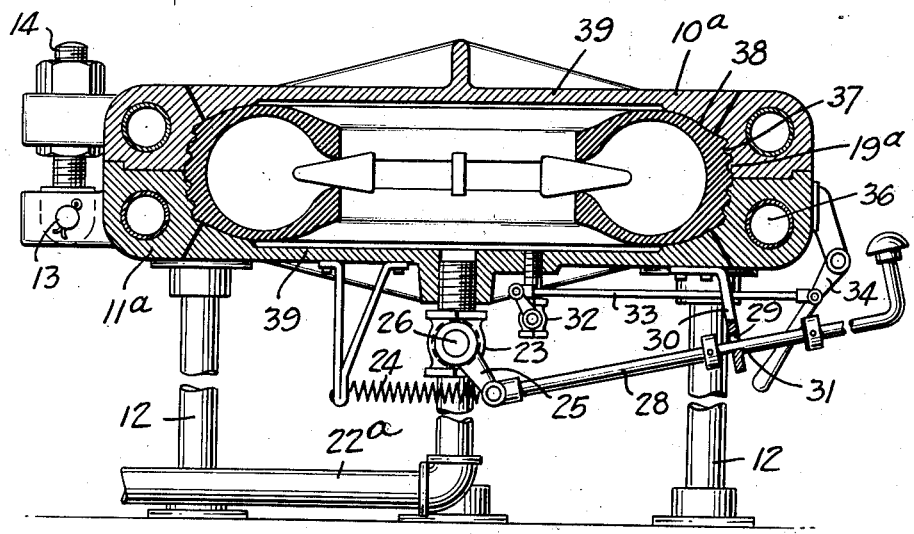
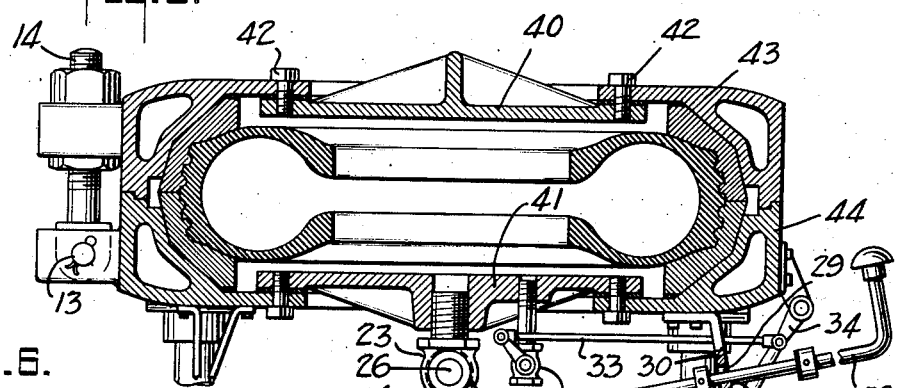
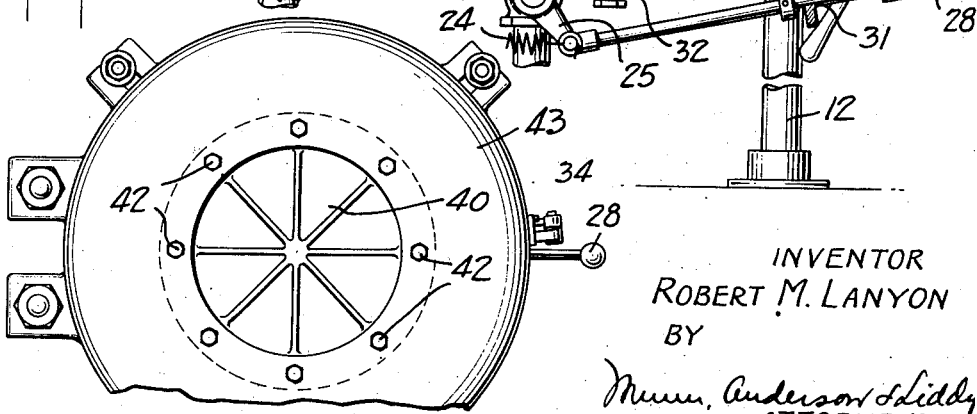
INVENTOR
ROBERT M. LANYON
BY
Munn, Anderson & Liddy
ATTORNEYS Patented Nov. 9, 1937

2,098,688

UNITED STATES PATENT OFFICE 2,098,688

TIRE MOLD

Robert M. Lanyon, Los Angeles, Calif.

Application January 21, 1936, Serial No. 60,036

5 Claims. (Cl. 18—34)

This invention relates to tire molds.

In molds of this class, whether designed for retreading worn tires or the fabrication of new tires, it has been the practice heretofore to place within the casing of the tire an inflatable air bag or bladder the function of which is to expand the walls of the casing radially in all directions against the engraved walls of the matrix of the mold, to thus cause and maintain close contact of the external surfaces of the casing walls with the engraved walls of the matrix throughout the molding and curing operation. It is generally conceded that tire fabricating processes employing such types of molds are slow and exceedingly laborious, requiring an expenditure of considerable time in setting the molds up preparatory to molding and curing the tire and in knocking same down for removal of the tire after the curing treatment.

The air bags above referred to are constructed of a good grade of rubber of heavy stock and are costly when considering the average extent of their usefulness. They can only be inflated quite slowly and because of the unavoidable irregularities in the surfaces with which they must necessarily contact when in the mold, they are easily rupture and will readily blow out. Furthermore, it is almost impossible to provide a bag the size of which is properly complementary circumferentially relative to the mold rim which it engages, thus inviting pinching and distortion of the bag with resulting damage thereto, to which can be added the fact that equal radial expansion of the casing walls cannot be effected, and the fact also that production of defective tires most always results in all those cases where the radial pressure of the tire against the matrix is not uniform at all places circumferentially of the tire tread and adjacent side walls.

Among many of the more important objects of my invention, the following are particularly enumerated:

1. To provide a tire mold the construction of which makes possible complete elimination of certain costly instrumentalities heretofore employed in such molds;

2. To greatly simplify the construction and reduce the cost of manufacture of such molds;

3. To materially reduce the labor and time heretofore required in the process of applying a tire to and removing same from the mold;

4. To provide a mold in which air under pressure can be directly applied to the thin walls of a tire casing from within the latter, the purpose being to effect instantaneous expansion of walls of the casing against the engraved walls of the matrix;

5. To provide a mold in which the force of air under pressure is directly applied against the readily flexible walls of the tube bore of the casing to effect instantaneous radial expansion of said walls and uniform impingement of the external surfaces of the casing against the engraved walls of the mold matrix in a manner to insure against undue loss of the air to the atmosphere at the instant the air is admitted to the casing and while maintaining the casing in an inflated condition;

6. To provide a mold which, when used to retread a tire, will insure proper spacing of the side walls and beads from hot mold surfaces, thus avoiding re-baking of said walls, which, if permitted would result in greatly weakening the walls;

7. To provide a mold which, when used for treading new tires, will make possible so-called "bead to bead" curing while maintaining all external surfaces of the casing in uniform contact with the walls of the mold void and while disposing the casing to enable direct passage thereto of air under pressure, such as will maintain said external casing surfaces in uniform contact with said walls of the mold void;

8. To provide a mold in which air may be quickly conducted to the casing and utilized to cause radial expansion of the casing walls by direct contact of the air therewith and whereby the air can be readily exhausted from within the casing when it is desired to remove the tire from the mold;

9. To provide a mold, the form and construction of which will enable the tire to be more readily removed therefrom upon completion of the curing process.

In the following description, I shall point out other objects of the invention and the important advantages achieved.

For the purpose of illustration, the accompanying drawings show several forms of molds, which will be referred to.

At this point in the description, I wish to emphasize the fact that the invention is based upon a new principle, which may be embodied in different specific forms. In choosing the form of the invention illustrated, I do not wish to place any limitation upon the invention, but wish it to be interpreted in the light of the hereto appended claims.

In the drawings,

Figure 1 is a top plan view of one form of mold with parts broken away and parts in section;

Figure 2 is a section taken on line 2—2 of Figure 1;

Figure 3 is a detail section taken on the line 3—3 of Figure 1;

Figure 4 is a view similar to Figure 3, showing a slightly different form of mold;

Figure 5 is a view similar to Figure 3, showing a still further form of the invention;

Figure 6 is a top plan view of the form shown in Figure 5;

In the form of my invention shown in Figures 1 to 3, inclusive, the mold is designed for the "bead-to-bead" curing of tires. It comprises upper and lower horizontally disposed mold members 10 and 11, the lower one of which is adapted to be supported above the floor by means of the customary legs 12. The upper member is hinged at 13 to the lower member, whereby it may be swung from a vertical opened position to the horizontal closed position shown in Figure 2, the usual forms of clamps 14 being employed for holding the two members securely together during the curing period. I make no claim to these specific details of construction, and reserve the privilege of departing therefrom as and when desired.

As distinguished from the open ended type of mold designed to enable access to be had to the interior of the mold and the customary air bag or bladder heretofore employed, each mold of the members 10 and 11 is provided with a head 15, strengthened by radial reinforcing ribs 16 to enable the head to withstand the pressure imposed thereagainst from within the mold chamber. It will suffice to say at this place in the description that the opposed or confronting faces of the complementary mold members 10 and 11 are formed to provide a conventional step joint 17 when the members are closed against each other.

The opposed faces of the mold members are formed so that said members mutually define a mold chamber having a centrally located portion 18 and an outer annular void 19, the latter adapted to receive the tire T as shown in Figure 2. Said void 19 is concentrically related to the portion 18 and the peripheral surfaces of said void are engraved to provide a matrix, the engraving on which corresponds to the design of tread to be molded on the tire. From the effective matrix surfaces of the void 19, the walls of said void are formed so as to contact the external surfaces of the side walls of the tire and said surfaces merge directly into the angular curing flanges 20 at the juncture of the void 19 with said central portion of the mold chamber, said flanges serving to directly engage the beads of the tire. It will be noted, however, that the annular flange 20 of the member 10 does not entirely contact or meet the flange 20 of the companion member 11. This is in order that an annular space 21 will be formed between said flanges to afford direct communication between the central portion 18 of the mold chamber and said void 19. This will be appreciated on reference to Figure 2, wherein use is made of spacers 22 in the form of wedges, adapted to be slightly driven between the beads of the tire to thereby hold the beads slightly spaced apart from each other.

The central portion of head 15 of the lower mold member 11 has threadedly connected therewith one end of an air supply pipe 22a. This pipe may lead to a source of air under pressure (not shown) and, as illustrated, said pipe is provided with a valve 23, tending to be urged to an open position of adjustment by a spring 24, the latter having one of its ends attached to the lever arm 25 on the stem 26 of the rotary plug 27 of said valve. Said arm is pivoted to one end of a slidable control rod 28, the outer end of which freely passes through an opening 29 in a bracket 30, hung from the mold member 11. The outer end of the rod 28 is disposed for convenient manipulation at one side of the mold and same is formed with a latching lug 31 adapted to latch behind the opening 29, as shown in Figure 2, at which time the valve 23 will be closed and the spring 24 fully tensioned. When the lug 31 is released from the plate 30, it follows that under the influence of the spring 24 the valve will be instantly opened to thereby admit air to the aforementioned mold chamber.

In order that air may be exhausted from the mold chamber, a valve 32 is operatively connected with said chamber and same is provided with a control rod 33, one end of which is pivotally connected with an actuating lever 34 at one side of the mold member 11.

At the juncture of the circumferential walls of the void 19 with the side walls of said void are bleed openings for discharge of free air and hot gases from between the external surfaces of the tire and the walls of said void, as is customary in the art.

It will be assumed, on reference to Figure 2 of the drawings, that the tire T being fabricated has been prepared as usual for the molding and curing operations and that preparatory to closing the mold members 10 and 11 on each other, the spacers 22 have been adjusted between the beads of the tire as first above referred to. With the mold members now firmly closed against each other, and assuming of course that the mold members are heated as usual through the steam chambers 36, the lug 31 is released from the plate 28 to thereby cause a sudden opening of the valve 23 and corresponding instantaneous admission of a sufficient volume of air under pressure to the central portion of the mold chamber. Inasmuch as the beads of the tire are spaced apart from each other to secure and maintain constant communication between the central portion of said chamber and the interior of the tire casing. In consequence thereof, air admitted to said central portion of the chamber will expand into the interior of the tire casing and thereby cause radial expansion of the walls of the casing in the direction of the walls of the void 19. This causes all external surfaces of the casing to snugly contact the confronting wall surfaces of the void 19 with absolute uniformity and in such manner that air from the source of supply cannot escape to the atmosphere through the vent apertures 35.

The form of my invention shown in Figure 4 is to all intents and purposes the same functionally as the form first above described, except that it is specifically intended for re-treading tires. It will suffice to say that the mold members 10a and 11a, instead of having a tire void running from bead to bead of the tire, are formed with a void 19a having the engraved matrix surfaces 37 and the short side wall surfaces 38. The heads 39 are formed and proportioned relative to the wall thickness of the void 19a to enable the major portions of the side walls of the casing to be disposed in spaced relation to the adjacent hot surfaces of the mold, thus preventing detrimental re-baking of the fabric during the process of re-treading an old tire.

In the form of the invention shown in Figures 5 and 6 of the drawings, I show means in the forms of heads 40 and 41 secured at 42 to the complementary mold members 43 and 44. It can be assumed that except for the heads 40 and 41 and the adjuncts of head 41, the mold herein shown is of the well known variety having normally open ends. By providing such mold with said heads 40 and 41, I convert same into the form of mold embodying the functional characteristics hereinabove referred to.

In each of the several forms of my invention herein disclosed, means are provided making possible complete elimination of heretofore expensive air bags and their attending complications and uncertainties of operation. Not only is such mold greatly simplified, but I am able through the means employed to insure better definition of the design upon the tread. This is made possible by the means 23 and the manner of disposing the tire in the mold chamber to cause quick expansion of the walls through direct admission of air under sufficient pressure, say about 100 lbs. to the square inch to the interior of the tire casing, a feature which, to the best of my knowledge, has never before been attempted.

I claim:

1. A tire mold comprising means providing a curing chamber having a matrix adapted to receive the casing of a pneumatic tire; means for spreading and holding the beads of the tire spaced from each other; and means for causing expansion of the walls of the casing against the walls of the matrix directly from within the mold and including means for conducting a suitable volume of air at a predetermined pressure to the interior of the casing through the space between said beads.

2. A tire mold having an annular matrix portion and spaced impervious side walls spanning said portion and co-acting therewith to define a curing chamber for completely enclosing a single tire casing with its beads spaced from each other for direct communication between the interior of the casing and the chamber; and means for expanding the casing internally into and maintaining the casing in vulcanizing contact with said matrix portion of the mold, by the admission of air to the chamber and to the interior of the casing through the space between its beads in sufficient volume and with sufficient rapidity to prevent collapsing of the casing by air leaking around the casing from the chamber.

3. A tire mold having an air vented annular matrix portion and spaced side walls spanning said portion and co-acting therewith to define a curing chamber for completely enclosing a tire casing with its beads spaced from each other for direct communication between the interior of the casing and the chamber; and means for admitting air to the chamber and to the interior of the casing through the space between its beads in sufficient volume and with sufficient rapidity to insure that the air will expand and maintain the casing in vulcanizing contact with said matrix portion rather than leak excessively around the casing and through said vents with the attendant collapse of the casing.

4. A tire mold comprising means defining a curing chamber adapted to receive a tire for curing; means for holding the beads of a tire casing spaced from each other when such casing is in said chamber; and means for admitting air to the chamber and into the interior of the casing between its beads so as to expand the casing in the chamber.

5. A tire mold comprising means defining a curing chamber adapted to receive a tire for curing; wedge members for holding the beads of a tire casing spaced from each other when such casing is in said chamber; and means for admitting air to the chamber and into the interior of the casing between its beads so as to expand the casing in the chamber.

ROBERT M. LANYON.